Dec. 20, 1938.   K. MIRUS-LEUSCHNER   2,140,844
DOOR WEATHER STRIP
Filed March 29, 1937
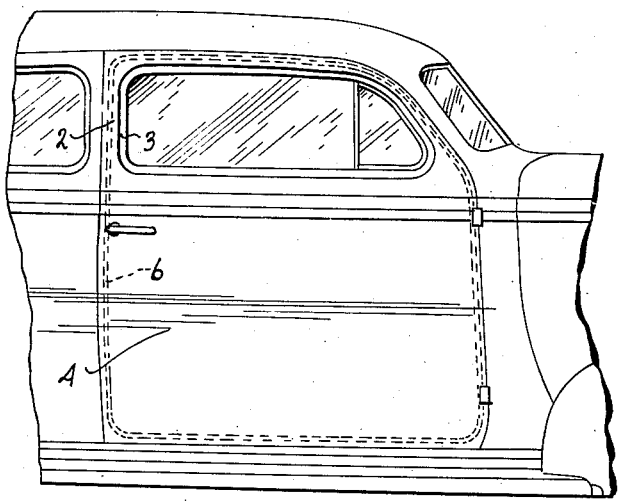
Fig. 1.
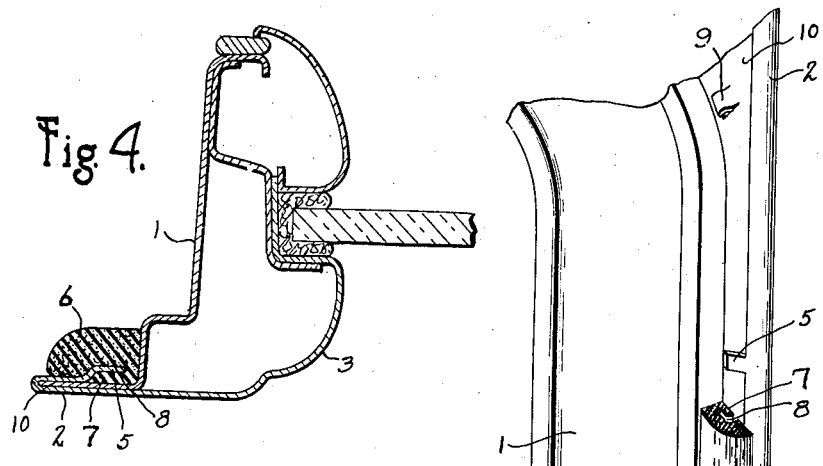
Fig. 4.
Fig. 2.
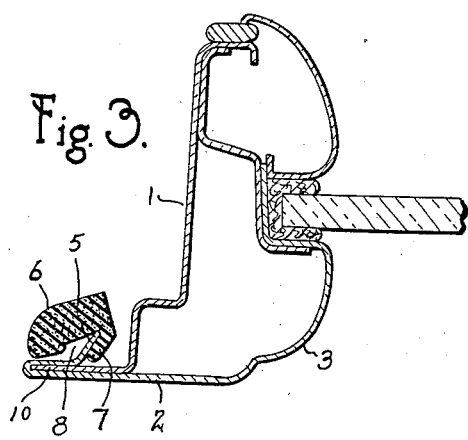
Fig. 3.
INVENTOR.
Kurt Mirus-Leuschner
BY
Barnes, Kisselle, Laughlin & Raisch
ATTORNEYS Patented Dec. 20, 1938

2,140,844

UNITED STATES PATENT OFFICE 2,140,844

DOOR WEATHER STRIP

Kurt Mirus-Leuschner, Detroit, Mich., assignor to General Motors Corporation, Detroit, Mich., a corporation of Delaware Application March 29, 1937, Serial No. 133,559

8 Claims. (Cl. 20—69)

This invention relates to the attachment of a weatherstrip to doors particularly an automobile door provided with an overlap flange. All sorts of ways have been proposed for attaching weather-sealing to the overlap flanges of refrigerator doors and automobile doors, such for instance as nailing, snap fasteners, snap clips, cementing, etc.

The present invention is believed to be an improvement in these in materially cheapening and expediting the work in making the attachment.

In the drawing:

Fig. 1 is a fragmentary elevation of an automobile body equipped with the weatherstrip.

Fig. 2 is a fragmentary perspective of a door pillar showing the weatherstrip in place.

Fig. 3 is a cross section of the same showing the weatherstrip in process of attachment.

Fig. 4 is a cross section showing the weatherstrip in its final position.

The metal door post comprises a door facing 1 that is folded out and under the fold-over door lap flange 2 which is part of the outside panel or stamping and which may be called the reveal at the window opening. The reveal is designated 3 but inasmuch as the overlap flange extends all around the door, this member will be referred to as the panel 4. This overlap flange has tongues 5 punched out of the panel material in a bias position. A rubber strip 6 which is preferably soft rubber and sponge rubber except for the flange portion 7 is used as the weatherstrip. This rubber strip has a groove in its base designated 8 and this is adapted to straddle the biased tongues 5 as shown in Fig. 3. The strip may then be hammered down in a position shown in Fig. 4 where the tongue 5 becomes a locking tongue.

At the sharp corners of the door where the door facing 1 curves away from the overlap flange 2, Fig. 2, tongues 9 are punched out of the inner panel 10 of the door facing. These tongues 9 are used in the same manner as tongues 5 to lock the rubber strip 7 in place adjacent the rounded corners of the door facing.

I claim:

1. The combination of a door or closure having an initially upstanding tongue, a weatherstrip having a recess concealed when the weatherstrip is seated in place, fitting over the tongue and clinched in place by turning over the tongue.

2. The combination of a door or closure having a sheet metal member provided with initially upstanding tongues and a weatherstrip provided with a groove concealed when the weatherstrip is seated in place, adapted to fit over the tongues and be clinched in place by turning over the tongues.

3. The combination of a door provided with an overlap flange having an initially upstanding tongue and a weatherstrip provided with a recess adapted to be fitted over the tongue which is wholly concealed in the weatherstrip and clinched in place by turning the tongue over on a portion of the weatherstrip.

4. The combination of a door closure provided with a door overlap flange having tongues biased with respect to the general frame of the door and a weatherstrip locked to the door by means of being fitted over the biased tongues and the tongues turned down to clinch the weatherstrip to the door.

5. The combination of a sheet metal door provided with an overlap flange with a plurality of initially upstanding tongues struck out of said flange and a weatherstrip in the form of a strip having a continuous groove arranged to be fitted over the tongues and the tongues turned down to clinch the weatherstrip to the overlap flange of the door.

6. The combination of a door provided with a sheet metal initially upstanding tongue and a weatherstrip of sponge rubber having however a groove and a solid rubber flange adjacent the groove, the said weatherstrip arranged to be fitted over the tongue which passes into the groove and the tongue be turned down over the solid rubber flange to clinch the weatherstrip to the door.

7. The combination of a sheet metal door provided with an overlap flange with a plurality of initially upstanding tongues struck out of the flange biased toward the edge of said door and a weatherstrip in the form of a strip having a continuous groove arranged to be fitted over the tongues and the tongues turned down to clinch the weatherstrip to the overlap flange in abutment with the edge of said door.

8. The combination of a sheet metal door provided with an overlap flange substantially at right angles to the edge of said door, a plurality of initially upstanding tongues struck out of said flange biased toward the edge of said door, and a weatherstrip of sponge rubber having however a groove and a solid rubber flange adjacent the groove, the said weatherstrip arranged to be fitted over the tongue which passes into the groove, the tongue to be turned down over the solid rubber flange to clinch the weatherstrip in abutting relationship to said overlap flange and to the edge of said door.

KURT MIRUS-LEUSCHNER.